United States Patent [19]

James et al.

[11] 4,385,587
[45] May 31, 1983

[54] APPARATUS FOR PROCESSING A FLEXIBLE MAGNETIC RECORDING MEDIUM

[75] Inventors: Richard N. James, San Jose; Kenneth S. Goodale, Mountain View, both of Calif.

[73] Assignee: Dysan Corporation, Santa Clara, Calif.

[21] Appl. No.: 195,973

[22] Filed: Oct. 10, 1980

[51] Int. Cl.³ .............................................. C23C 13/08
[52] U.S. Cl. ...................................... 118/50; 118/56; 118/500
[58] Field of Search ..................... 427/47, 48, 127–132; 118/50, 107, 500, 56; 428/900

[56] References Cited

U.S. PATENT DOCUMENTS 3,928,657  12/1975  Armstrong et al. ................. 427/47
4,001,463  1/1977  Schaefer et al. ...................... 427/48

Primary Examiner—Bernard D. Pianalto
Attorney, Agent, or Firm—Townsend and Townsend

[57] ABSTRACT

Apparatus and a method for positioning a flexible magnetic recording medium, such as a floppy disk, in such a way as to permit magnetic means on opposed sides of the medium to orient the particles in the magnetic coatings on the medium immediately after the coatings have been applied to the medium and as the medium is rotated. In one embodiment, the apparatus includes stabilizing devices which are located at circumferentially spaced locations about the outer periphery of the medium when the medium is mounted for rotation about a generally horizontal axis. Each device comprises a pair of substantially J-shaped, wire-like members secured at first ends to a shaft and presenting second ends which are spaced apart to define a gap between which the outer peripheral margin of the medium passes. The J-shaped members can be tubular or solid. If tubular, they can receive a fluid under pressure from a source coupled with the shaft and direct the fluid onto the opposite sides of the medium as the medium rotates. If solid, the outer ends of the J-shaped members of the devices effectively keep the medium centered in the gaps without assistance from a pressurized fluid. In a second embodiment, a pair of bowl-shaped members are hingedly mounted together and moved into face-to-face relationship with each other but are spaced apart to present an outer peripheral, continuous gap which receives the outer peripheral margin of the medium when the medium is rotatably mounted on one of the bowl-shaped members. Air is directed into the interiors of the bowl-shaped members and then outwardly therefrom through the gap on opposite sides of the medium to provide a Venturi effect to keep the outer peripheral margin of the medium centered in the gap and stabilized against deviation out of the plane of rotation of the medium.

27 Claims, 6 Drawing Figures

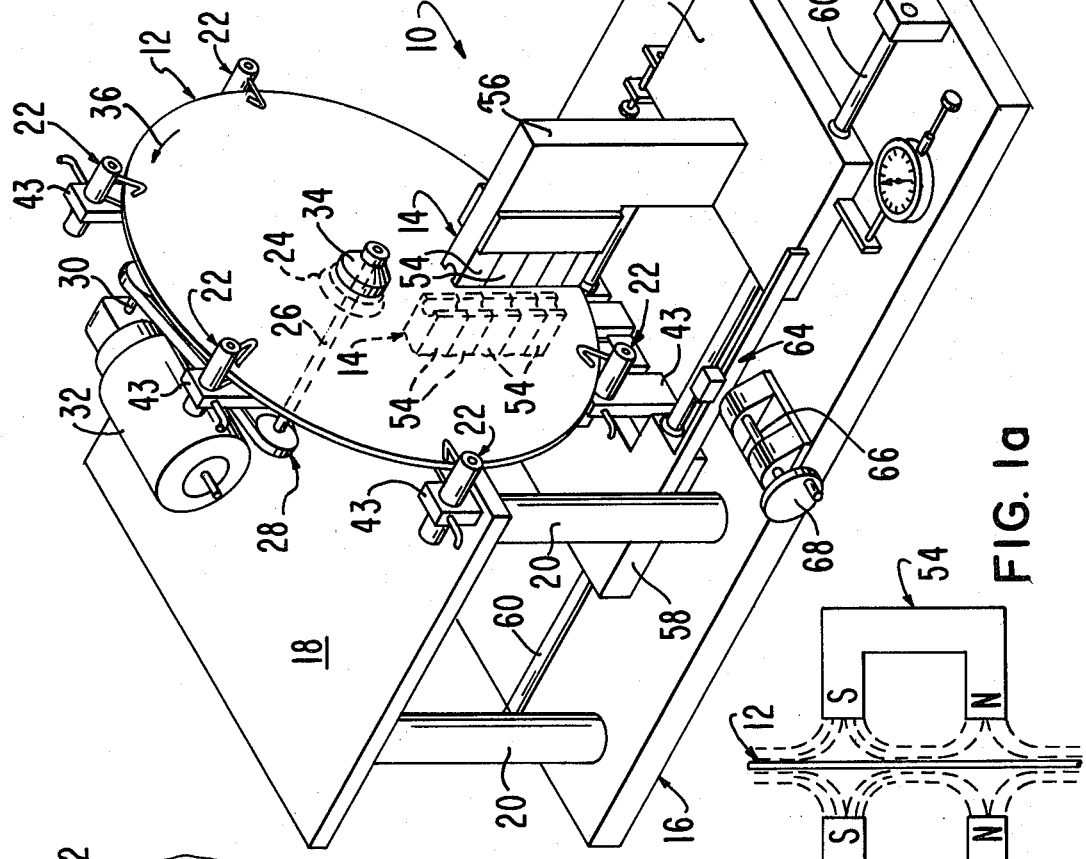
FIG. 1
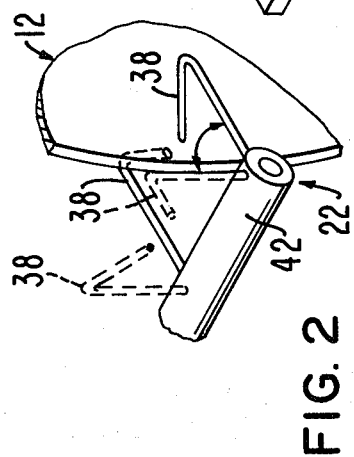
FIG. 2
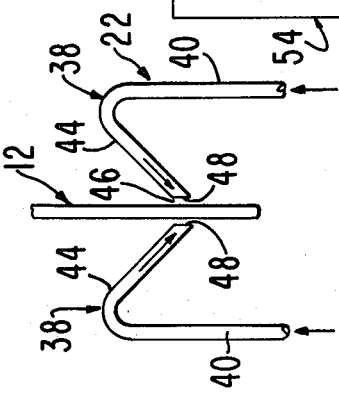
FIG. 3
FIG. 1a

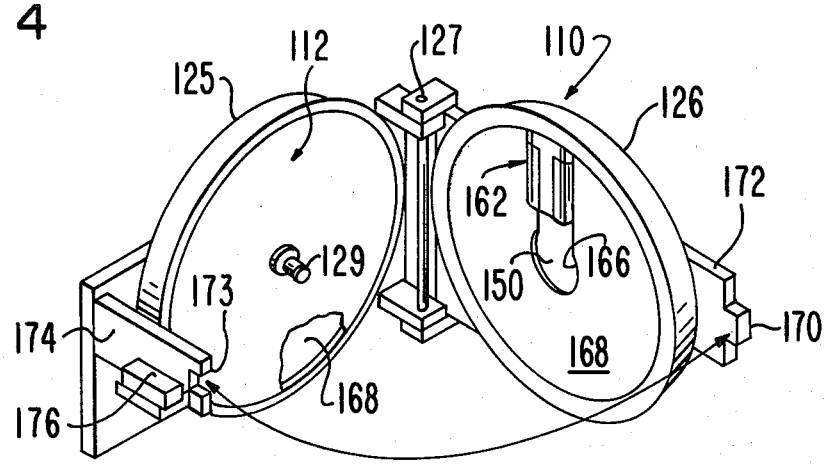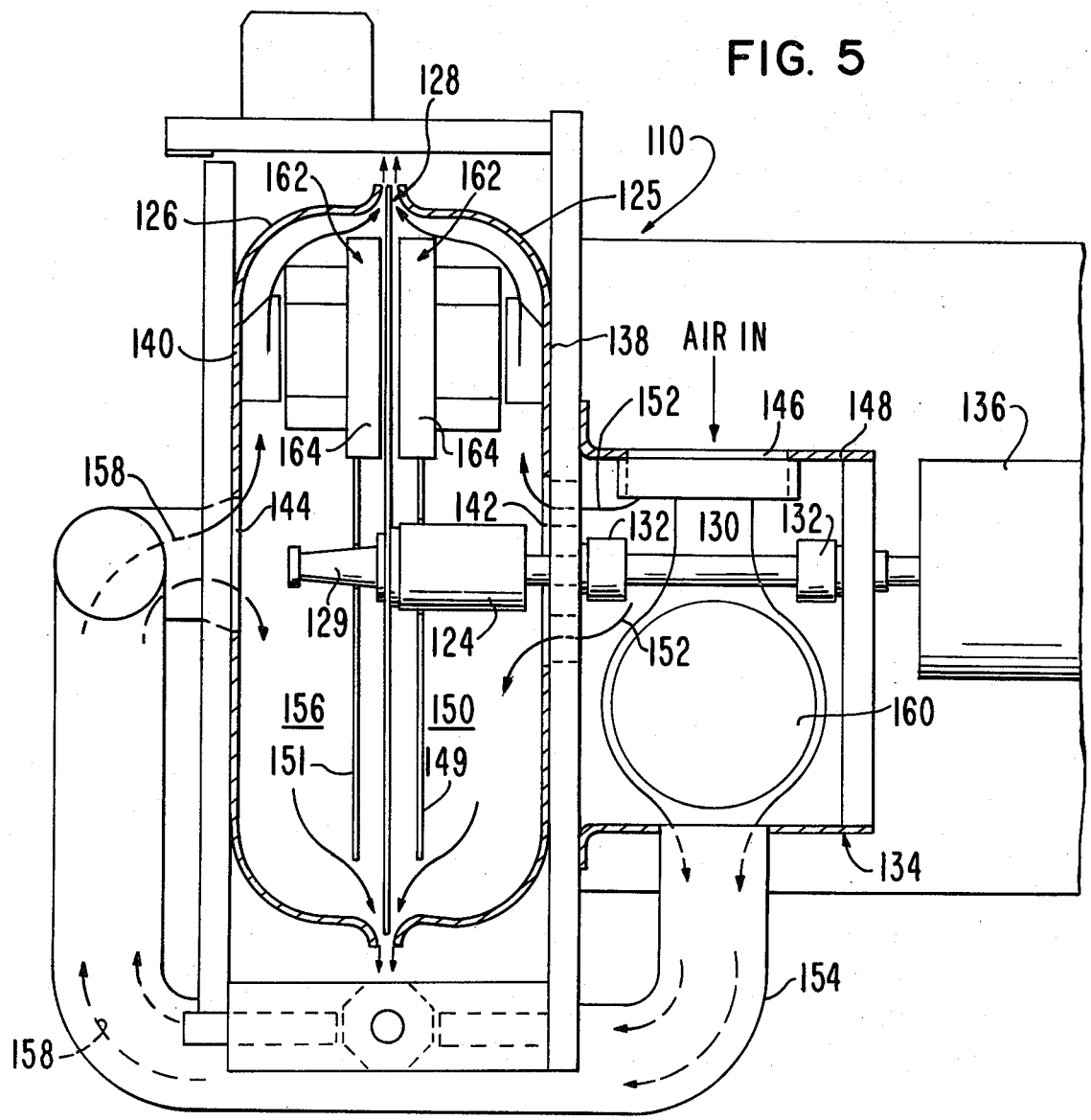

APPARATUS FOR PROCESSING A FLEXIBLE MAGNETIC RECORDING MEDIUM

This invention relates to improvements in the manufacture of magnetic recording media and, more particularly, to an improved apparatus and method for handling a flexible magnetic medium to permit it to be properly positioned for further processing during the manufacture thereof.

BACKGROUND OF THE INVENTION

In the manufacture of rigid magnetic recording media, it is the usual practice to coat both sides of a metallic disk with a magnetic coating material and then to orient the magnetic particles of the coating material before the coating dries completely. This is done by placing magnets on opposite sides of the coated disk immediately after it has been coated and before the coating has dried. The magnets on both sides of the disk present a magnetic field which extends substantially parallel to the plane of the disk. As a result, the magnetic particles are oriented generally in a circumferential direction with reference to the central axis of the disk. This orientation of the magnetic particles provides for greater recording quality of the disk and improves its packing density considerably, both highly desirable features.

While the foregoing technique is satisfactory for rigid disks, it is unsatisfactory for flexible or floppy disks because, as the disks are mounted for rotation, either in a vertical plane or in a horizontal plane, the motion of the disk is not stabilized because the flexibility of the disk causes it to deviate from the plane of its rotation. Thus, the magnets on opposite sides of the disks cannot function correctly because of variations in the magnetic field due to the wobbling or other unstable movements of the disk. Nonetheless, it is extremely desirable to have orientation of the magnetic particles of floppy disks to achieve the desired features mentioned above.

Because of the drawbacks associated with rotatably mounting of flexible magnetic disks to permit orientation of their magnetic particles, a need has arisen for an improved apparatus and method for mounting the disks to permit magnetic particle orientation during the manufacturing of the disks.

SUMMARY OF THE INVENTION

The present invention satisfies the aforesaid need by providing apparatus and a method for rotatably mounting a magnetic disk in a predetermined plane in such a way that the disk can be rotated and remain in a stable condition without lateral deviation from its plane of rotation. Thus, magnets on opposite sides of the plane of rotation of the disk can orient the magnetic particles of the magnetic coating on the opposite faces of the disk immediately after the coating has been applied and while the coating is drying.

To this end, the apparatus of the present invention includes means near the outer periphery of the disk for holding the disk against wobbling or moving out of its plane of rotation while the disk is rotating and while the disk is being processed, such as by a pair of magnets are on opposite sides of the disk for orienting the magnetic particles of the magnetic coatings on the disk. In one embodiment of the invention, the stabilizing means comprises a plurality of disk aligning devices each having a pair of wire-like members on opposite sides of the outer peripheral margin of the disk at spaced locations about the disk. These wire-like members are spaced apart to present gaps through which the outer peripheral margin of the disk passes as the disk rotates. The wire-like members keep the disk centered in the gaps and prevent the disk from moving from side-to-side out of its plane of rotation. The wire-like members can be solid, or they can be tubular to allow a fluid under pressure to pass through the members and to impinge on opposite faces of the disk to assist in keeping the disk centered in the gaps.

In another embodiment, the disk is placed between a pair of bowl-shaped members which face each other and are spaced apart to present a continuous, outer peripheral gap into which the outer peripheral margin of the disk extends. The disk is mounted in the space between the bowl-shaped members for rotation. While the disk rotates, air is directed into plenums in the bowl-shaped members and then out of the outer peripheral gap on opposite sides of the disk to present a Venturi effect which keeps the disk centered in the gaps as magnets on opposite faces of the disk orient the magnetic particles of the coatings of the disk.

The primary object of this invention is to provide apparatus and a method for mounting a flexible magnetic medium for rotation in a manner such that the medium remains in a predetermined plane as it rotates to permit the medium to be subjected to one or more processes, such as the orientation of the particles in the magnetic coating on the medium.

Another object of the present invention is to provide apparatus and a method of the type described wherein a magnetic disk is mounted for rotation in a generally vertical plane while the magnetic coating on opposite faces thereof are drying so that magnets on opposite sides of the disk can uniformly orient the magnetic particles of the coatings while the disk remains substantially in such plane.

Other objects of this invention will become apparent as the following specification progresses, reference being had to the accompanying drawings for an illustration of several embodiments of the invention.

BRIEF DESCRIPTION OF THE DRAWINGS

FIG. 1 is a perspective view of one embodiment of the apparatus for mounting a floppy disk for orientation of the magnetic particles of the coatings on the disk immediately after the coatings have been applied to the disk;

FIG. 1a is a fragmentary, top plan view of the disk and magnets on opposite sides of the disk to show the magnetic field for orienting the particles;

FIG. 2 is an enlarged, fragmentary perspective view of one portion of the disk, showing the stabilizing means for the outer peripheral margin of the disk;

FIG. 3 is an top plan view of the stabilizing means near one outer peripheral location of the disk;

FIG. 4 is a perspective view of a second embodiment of the apparatus for orienting the magnetic particles on the coatings of a disk; and FIG. 5 is an enlarged, horizontal section of the apparatus of FIG. 4 when the disk is mounted thereon for rotation.

DETAILED DESCRIPTION OF THE DRAWING

The first embodiment of the apparatus of the present invention is broadly denoted by the numeral 10 and is adapted for use in mounting a floppy disk 12 in a vertical plane for rotation about the central axis of the disk. When so mounted and rotating, the disk can have the magnetic particles of its coating oriented by magnetic means 14 hereinafter described as coatings are drying immediately after application of the coatings to the disk.

Apparatus 10 includes a base plate 16, a platform 18 mounted on base plate 16 by legs 20, and a plurality of disk aligning or stabilizing devices 22 located on base 16 and platform 18 so that the devices will be near the outer peripheral margin of disk 12 when the disk is mounted on the platform for rotation.

Platform 18 has a hub 24 shown in dashed lines in FIG. 1, the hub being mounted for rotation by bearings (not shown) about a generally horizontal axis. The hub has a shaft 26 coupled to a belt and pulley assembly 28 which, in turn, is coupled to a drive shaft 30 of a motor 32 mounted in any suitable manner on platform 18. Disk 12 is removably connected to hub 24 by a magnetic member 34 which is magnetically attracted to hub 24 and urges the center of disk 12 into engagement with the hub for rotation therewith. Member 34 is manually separated from the disk and hub when it is desired to remove the disk from the hub. Rotation of the hub causes disk 12 to rotate in the direction of arrow 36 (FIG. 1).

Devices 22 are provided to keep disk 12 in a generally vertical plane as the disk is rotated by the hub. Without the stabilizing effect of devices 22, the disk could wobble or otherwise move out of its vertical plane. In such a case, the disk would not be properly positioned so that its magnetic particles could be uniformly oriented by magnetic means 14.

Each device 22 includes a pair of wire-like members 38 on opposite sides of the disk, members 28 having parallel legs 40 which are secured at spaced locations to a shaft 42 mounted on a base 43 as shown in FIG. 2. Members 38 also have second, angled legs 44 which are integral with respective legs 40 and extend away from legs 40 and toward the disk to present a gap 46 for receiving the outer peripheral margin of the disk. In effect, members 38 are essentially J-shaped and each member 38 has a flat end face 48 on the outer end of its corresponding leg 44.

Members 38 and shaft 42 are preferably tubular so that air or other pressurized fluid can flow into and through the shaft and through members 38 for exit from the open end faces 48 of members 38. The air leaving members 38 impinges on the adjacent flat faces of the disk and, if the two air flows are uniform, the disk will be essentially centered in gap 46 and thereby be stabilized during rotation of the disk about the axis of hub 24. A fluid line 50 (FIG. 1) is coupled with each shaft 42 for placing a source of the pressurized fluid in communication with shaft 42.

There are a number of devices 22 mounted at spaced, circumferential locations about the path of travel of the outer periphery of disk 12. For instance, several of devices 22 are mounted directly on platform 18. Also, a pair of such devices 22 can be mounted on a base 43 (FIG. 1) which extend upwardly from the platform. A pair of devices 22 can be mounted on bases 43 directly secured to the upper surface of base plate 16. Typically, there are six such devices arranged uniformly spaced about the path of travel of the disk.

While members 38 are described above as being tubular for receiving the pressurized fluid, it is possible that no such fluid need be used. In such a case, members 38 could be solid and could still provide a stabilizing effect for disk 12 as it rotates.

Shaft 42 of each device 22 is preferably moveable to permit movement of members 38 into and out of locations on opposite sides of the disk. This allows the disk to be put into and taken out of the operative position thereof shown in FIG. 1. As shown in FIG. 2, shaft 42 is rotatable on its base 43 so that members 38 can move from the dashed line, retracted locations of FIG. 2 to the full line, operative locations thereof. In the alternative, each base 43 could be linearly moveable so that members 38 can move in a straight line toward and away from their operative locations.

Magnetic means 14 include an assembly of magnets 54 on each side of the disk respectively. For purposes of illustration, each of the magnets has a north pole and a south pole which are in opposition to the corresponding pole on the opposite side of the disk as shown in FIG. 1a. Thus, the magnetic lines of force from the poles will extend in the plane of the disk and thereby circumferentially of the disk for orienting the magnetic particles in the coatings on both sides of the disk.

For purposes of illustration, there are five magnets 54 on each side of the disk. Each assembly of magnets is carried by an upright post 56 mounted on a base plate 58 shiftably mounted on a pair of guide rods 60 anchored by end blocks 62 to the upper surface of base 16. A rack and pinion assembly 64 controlled by a manually rotatable shaft 66 causes base plates 58 to move toward and away from each other so that the magnetic assemblies made up of magnets 54 can move toward and away from the disk. A knob 68 is coupled to shaft 66.

In operation, members 38 of devices 22 are initially in their retracted locations (the dashed line locations of FIG. 2). After a disk 12 has been coated with magnetic coating material on both sides and before the coating has set, the disk is transferred from the coating station to hub 24 and secured to the hub by magnetic hub member 34. Then, members 38 of devices 22 are manually moved into the operative locations thereof shown in FIGS. 1 and 3 and motor 32 is energized to cause spinning of disk 12 in the direction of arrow 36. Then, the magnets 54 are moved into the operative positions thereof shown in FIGS. 1 and 1a, such positions being sufficiently close to the disk so that the magnetic particles in the magnetic coatings on both faces of disk 12 will be oriented in circumferential directions as the disk rotates. Typically, the orientation time is in the range of 15 to 30 seconds, and the magnetic coatings will typically set after the orientation time has elapsed. After the orientation time, the magnets are moved away from the disk, the rotation of the disk is stopped, and devices 22 are moved into their retracted locations, and the disk is removed from the hub and replaced by another disk whose particles are to be oriented.

If desired, apparatus 10 could be provided with a coating means for both sides of the disk. In this way, the disk could be coated on apparatus 10 and immediately thereafter, the magnetic particles of the coatings could be oriented by magnetic means 14 on opposite sides of the disk. In such a case, the coating means could comprise a spray nozzle on each side of the disk, each nozzle moving either radially inwardly or radially outwardly with respect to the central axis of the disk during which time, the magnetic coatings in liquid form would be sprayed by the nozzle onto the respective faces of the disk and then allowed to dry as the magnetic particles are being oriented and as the disk continues to rotate.

A second embodiment of the apparatus of this invention is broadly denoted by the numeral 110 and is adapted to magnetically orient the magnetic particles on the coatings of a floppy disk 112 mounted on a hub 124 carried by one of a pair of bowl-shaped members 125 and 126 which are hingedly connected together by hinge means 127 (FIG. 4) at respective sides of members 125 and 126. The hinge means is located so that the members 125 and 126 move into and out of face-to-face relationship as shown in FIG. 5 in which the circular outer peripheries of members 125 and 126 are spaced apart to present an annular gap 128 (FIG. 5) which receives the outer peripheral margin of disk 112. The disk is releasably coupled by a magnetic member 129 to a hub 124, and the hub is coupled to a shaft 130 carried by bearings 132 on a support 134. A drive motor 136 is coupled with shaft 130 for rotating hub 124 and thereby disk 112 when member 129 is magnetically coupled to hub 124.

Members 125 and 126 are provided with flat side walls 138 and 140, respectively, such walls having openings 142 and 144, respectively, for the entrance of air under pressure from a blower (not shown) coupled to an air inlet opening 146 on the sidewall 148 of support 134. A pair of walls 149 and 151 (FIG. 5) are carried by respective members 125 and 126 to define plenums 150 and 156 which are open near the outer peripheries of walls 149 and 151. Air enters directly into plenum 150 of member 126 from air inlet opening 146 by way of flow paths identified by arrows 152. Air entering plenum 156 first passes through support 134 and then through a duct 154 to and through opening 144 into plenum 156. The path for this air flow is noted by arrows 158.

As the air under pressure enters plenums 150 and 156, the air flows out of the plenums and into and through gap 128 on opposite sides of the outer periphery of the disk. In this way, the disk is spaced uniformly inwardly from the annular, outer peripheral end faces of members 125 and 126 and the disk is thereby stabilized during rotation.

To heat the air after it enters opening 146, a heater 160 is provided in support 134. This heated air when it enters plenums 150 and 156 can seep through openings surrounding hub 124 and member 129 ad enter the space between walls 149 and 151 for contact with disk 112. This expedites the drying of the coatings on opposite sides of disk 112.

Each of members 125 and 126 carries a magnetic means 162 in position to orient the magnetic particles of the coatings on opposite sides of the disk. For purposes of illustration, magnetic means 162 of each of members 125 and 126 comprises an electromagnet 164 which has a certain radial length and juts out from the slot 166 in the corresponding wall 149 or 151. The magnetic fields of magnets 164 are such that they extend circumferentially of the disks so that the orientation of the magnetic particles of the coatings on the disks extend circumferentially as is desired.

In operation, members 125 and 126 are separated from each other in the manner shown in FIG. 4. In this condition, member 125 can receive a disk 112 on hub 124 and the disk can be held on the hub by magnetic member 129. Then, the members are moved into a position adjacent to each other as shown in FIG. 5 and held in this position in any suitable manner. For purposes of illustration, a metallic projection 170 on a plate 172 attached to member 126 is received within a slot 173 in a second plate 174 carried by member 125. A magnet 176 on plate 174 releasably holds projection 170 in slot 172.

Then, air is directed from a blower (not shown) into opening 146 where the air passes into openings 142 and 144 of members 125 and 126. The air is allowed to pass into and out of plenums 150 and 156 and through annular gap 128.

Disk 112 is then rotated by actuating motor 136 and electromagnets 164 are energized for a predetermined period of time during rotation of the disk and as air leaves gap 128. Thus, the disk is stabilized against lateral movement as the magnetic particles on the coatings on both sides of the disk oriented circumferentially of the disk. The air can be heated by heater 160 to decrease the drying time of the coatings while disk 112 rotates and during the magnetic orientation of the magnetic particles of the coatings. As soon as the orientation and drying have been completed, the disk can be removed from hub 124 after members 125 and 126 have been separated from each other and moved into the positions thereof shown in FIG. 4.

We claim:

1. Apparatus for orienting the magnetic particles of a magnetic coating on a flexible magnetic recording medium comprising: means adapted to be coupled to the medium for mounting the same in an operative position for rotation in a predetermined plane; means adjacent to said mounting means for rotating said medium; fluid flow means adjacent to the outer periphery of the medium when it is in said operative position for keeping the medium from deviating laterally from said plane when the medium is rotated by said rotating means, whereby the medium is maintained in said plane; and means adjacent to said operative position for providing a magnetic field magnetically coupled with the particles of the coating on the medium when the medium is in said operative position to orient the particles in predetermined directions.

2. Apparatus as set forth in claim 1, wherein said keeping means includes structure on each side of said operative position of the medium for forming a gap, the outer peripheral margin of the medium being in the gap when the medium is in said operative position.

3. Apparatus as set forth in claim 2, wherein said means forming the gap includes a pair of elongated members on opposite sides of said operative position, respective first ends of the members being spaced apart and defining the gap, and means secured to the opposite ends of the members for mounting the same adjacent to said operative position.

4. Apparatus as set forth in claim 3, wherein each of said members is substantially J-shaped.

5. Apparatus as set forth in claim 3, wherein said mounting means for the members comprises a shaft, said shaft being moveable relative to said operative position to move the members into and out of operative locations on opposite sides of said operative position.

6. Apparatus as set forth in claim 5, wherein is provided means coupled with the shaft for mounting the same for rotation about an axis generally parallel with said axis.

7. Apparatus as set forth in claim 5, wherein said members and said shaft are tubular with the first ends of the members being open, said shaft adapted to be coupled to a source of fluid under pressure, whereby the fluid can pass through and out of the members and against the medium to keep the medium in the gap.

8. Apparatus as set forth in claim 1, wherein said keeping means comprises a plurality of medium aligning devices at respective circumferential locations about said operative position, each device having means defining a gap for receiving the outer peripheral margin of the medium when the medium is in said operative position.

9. Apparatus as set forth in claim 1, wherein said keeping means includes a pair of bowl-shaped members on opposite sides of said operative position, each member having an outer peripheral margin spaced from the outer peripheral margin of the other member to present a gap for receiving the outer peripheral edge margin of the medium when the medium is in said operative position, and means coupled with the members for directing a fluid under pressure through the members and out of the gap on opposite sides of said operative position.

10. Apparatus as set forth in claim 9, wherein said members are hingedly mounted to each other at respective sides thereof to permit the members to separate and allow the medium to be coupled to and removed from said mounting means.

11. Apparatus as set forth in claim 10, wherein said mounting means is carried by one of the members, said means for providing a magnetic field comprising a magnet for each member, respectively, the magnet extending radially of said axis.

12. Apparatus as set forth in claim 11, wherein each magnet is an electromagnet.

13. Apparatus as set forth in claim 9, wherein is included means for heating the fluid as the same is directed toward said members.

14. Apparatus as set forth in claim 1, wherein said means for providing a magnetic field comprises a magnet moveable toward and away from said operative position.

15. Apparatus as set forth in claim 1, wherein said magnet means comprises a magnetic assembly on each side of said operative position, respectively, each assembly having a magnet with a north pole and a south pole, the north pole of the assembly on one side of said operative position being in alignment with and in opposition to the north pole of the assembly on the opposite side of said operative position, whereby the magnetic fields of the magnets will be oriented in a direction generally transverse to said axis.

16. Apparatus as set forth in claim 15, wherein is included means mounting each magnetic assembly for movement toward and away from said operative position.

17. In apparatus for processing a flexible magnetic recording medium: means adapted to be coupled to the medium for mounting the same in an operative position for rotation in a predetermined plane; and fluid flow means near the outer periphery of the medium when it is in said operative position for keeping the medium from deviating laterally from said plane when the medium is rotated in said plane, whereby the medium is maintained in said plane.

18. In apparatus as set forth in claim 17, wherein said mounting means includes structure for orienting the medium for rotation about a generally horizontal axis.

19. In apparatus as set forth in claim 17, wherein said keeping means includes structure on each side of the operative position for forming a gap, the outer peripheral margin of the medium being in the gap when the medium is in said operative position.

20. In apparatus as set forth in claim 19, wherein said means forming the gap includes a pair of elongated members on opposite sides of said operative position, respective first ends of the members being spaced apart and defining the gap, and means secured to the opposite ends of the members for mounting the same adjacent to said operative position.

21. Apparatus as set forth in claim 20, wherein each of said members is substantially J-shaped.

22. Apparatus as set forth in claim 20, wherein said mounting means for the members comprises a shaft, said shaft being moveable relative to said operative position to move the members into and out of locations on opposite sides of said operative positions.

23. Apparatus as set forth in claim 22, wherein is provided means coupled with the shaft for mounting the same for rotation about an axis generally parallel with said axis.

24. Apparatus as set forth in claim 22, wherein said members and said shaft are tubular with the first ends of the members being open, said shaft adapted to be coupled to a source of fluid under pressure, whereby the fluid can pass through and out of the members and against the medium to keep the medium in the gap.

25. Apparatus as set forth in claim 17, wherein said keeping means comprises a plurality of medium aligning devices at respective circumferential locations about said operative position, each device having means defining a gap for receiving the outer peripheral margin of the medium when the medium is in said operative position.

26. Apparatus as set forth in claim 17, wherein said keeping means includes a pair of bowl-shaped members on opposite sides of said operative position, each member having an outer peripheral margin spaced from the outer peripheral margin of the other member to present a gap for receiving the outer peripheral edge of the medium when the medium is in said operative position, and means coupled with the members for directing a fluid under pressure through the members and out of the gap on opposite sides of said operative position.

27. Apparatus as set forth in claim 26, wherein said members are hingedly mounted to each other at respective sides thereof to permit the members to separate and allow the medium to be coupled to and removed from said mounting means.

* * * * *